United States Patent [19]

Bellina

[11] 3,872,169

[45] Mar. 18, 1975

[54] AMINO-OXIME ACETAMIDE-O-CARBAMATES AS ANTIHYPERTENSIVES

[75] Inventor: Russell F. Bellina, Wilmington, Del.

[73] Assignee: E. I. du Pont de Nemours and Company, Wilmington, Del.

[22] Filed: Feb. 14, 1974

[21] Appl. No.: 442,406

[52] U.S. Cl...... 260/558 A, 260/557 R, 260/561 A, 260/564 G, 424/320, 424/324, 424/326
[51] Int. Cl............................................ C07c 103/28
[58] Field of Search........ 260/558 A, 557 R, 561 A, 260/564 G

[56] References Cited
UNITED STATES PATENTS

| | | | |
|---|---|---|---|
| 3,472,872 | 10/1969 | Bell | 260/564 G |
| 3,560,555 | 2/1971 | Fuchs | 260/566 AC |
| 3,636,111 | 1/1972 | Karten | 260/566 AC |
| 3,742,056 | 6/1973 | Henderson | 260/564 G |

*Primary Examiner*—Bernard Helfin
*Assistant Examiner*—Gerald A. Schwartz

[57] ABSTRACT

Certain novel amino-oxime acetamide-0-carbamates have antihypertensive activity when administered to warm-blooded animals. Representative compounds include 2-(o-chlorobenzylamino)-2-methylcarbamyloximido-N,N-dimethylacetamide and 2-(o-fluorobenzylamino)-2-N-methylcarbamyloximido-N,N-dimethylacetamide.

6 Claims, No Drawings

3,872,169

AMINO-OXIME ACETAMIDE-O-CARBAMATES AS ANTIHYPERTENSIVES

BACKGROUND OF THE INVENTION

This invention relates to certain novel aminooxime acetamide-O-carbamates which are useful as antihypertensive agents.

Canadian Pat. No. 878,525 discloses a class of amidoxime-O-carbamates, useful as antihypertensive agents, having the following formula $$R - C(NH_2) = N - O - C(=O) - N(R_1)(R_2)$$

where
R is an aliphatic hydrocarbon having from 3 to 12 carbon atoms, and
$R_1$ and $R_2$ are each hydrogen or lower alkyl of 1 to 3 carbon atoms with the proviso that the sum of carbon atoms in $R_1$ and $R_2$ taken together does not exceed 3.

U.S. Pat. application Ser. No. 245,270, filed Apr. 18, 1972 now abandoned, also discloses a class of amidoxime-O-carbamates, useful as antihypertensive agents, having the following formula $$R - C(N(R_1)(R_2)) = N - O - C(=O) - N(R_3)(R_4)$$

wherein:
R is a saturated aliphatic or alicyclic hydrocarbon radical having 3 through 12 carbon atoms;
$R_1$ is an alkyl group having 1 through 6 carbon atoms;
$R_2$ is hydrogen or an alkyl group having 1 through 6 carbon atoms.
$R_1$ and $R_2$, taken together can form a polymethylene group having 4 or 5 carbon atoms; and
$R_3$ and $R_4$, independently, are hydrogen or alkyl of 1 through 3 carbon atoms;
with the proviso that the sum of carbon atoms in $R_3$ and $R_4$ does not exceed 3.

The compounds of the present invention differ structurally from the prior art compounds and constitute a novel class of antihypertensive agents.

SUMMARY OF THE INVENTION

According to this invention, there is now provided a class of novel chemical compounds useful as antihypertensive agents. These compounds are represented by the following general formula (I) $$R_3R_4N-C(=O)-C(=N-O-C(=O)-N(R_2)(R_1))-N(H)(R)$$

wherein:
R is hydrogen, methyl, ethyl, normal propyl, isopropyl, cycloalkyl of 3–7 carbons, including cycloalkylalkyl of 3–7 carbons, allyl, phenyl-X, -CH(R_5)-phenyl-X, -CH_2CH_2-phenyl-X where X is H, Br, Cl, F, or $CF_3$, and $R_5$ is H, $CH_3$, $C_2H_5$, n-$C_3H_7$, or iso-$C_3H_7$;
$R_1$ and $R_2$ are the same or different and are hydrogen, methyl, ethyl, normal- iso- or cyclopropyl, or allyl, with the proviso that the sum of the carbon atoms in $R_1$ and $R_2$ does not exceed 4;
$R_3$ and $R_4$ are the same or different and are $C_1$–$C_3$ alkyl.

Preferred compounds of this invention are those where R is cyclopentyl, phenyl-X, or -CH_2-phenyl-X;

and more preferred, where R is one of these substituents, are those compounds where $R_2$ is hydrogen, $R_1$, $R_3$, and $R_4$ are methyl, and X is fluorine and chlorine. Most preferred compounds are 2-(o-chlorobenzylamino)-2-N-methylcarbamyloximido-N,N-dimethylacetamide and 2-(o-fluorobenzylamino)-2-N-methylcarbamyloximido-N,N-dimethylacetamide. Processes of making these compounds along with pharmaceutical compositions comprising and methods of treating antihypertensiveness utilizing these compounds are included.

DETAILED DESCRIPTION OF THE INVENTION

The synthesis of the compounds of Formula I proceeds by reacting one part of 2-chloro-2-oximido-N,N-dialkyl acetamide $$R_3R_4N-C(=O)-C(Cl)=N-OH$$

as disclosed in U.S. Pat. No. 3,557,089, and two parts of $NH_3$ or the appropriate primary amine $RNH_2$, wherein R, $R_3$, and $R_4$ are as defined above. One extra part of the amine, which is used as a hydrogen chloride scavenger, may be substituted by a tertiary amine, such as triethylamine, trimethylamine, or 1,4-diazabicyclooctane (DABCO). The reaction is carried out in an inert solvent such as tetrahydrofuran, methylene chloride, or chloroform, and at a temperature of 20°C. to 60°C. The reaction is usually completed in 4 to 5 hours, but may be left for 10 to 15 hours.

The amine hydrochloride salt that usually precipitates out is removed by filtration. The filtrate is concentrated or distilled to remove solvent, yielding 2-amino-2-oximido-N,N-dialkylacetamide

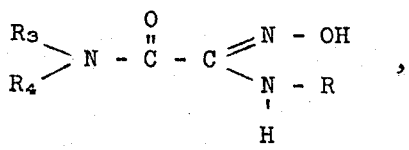
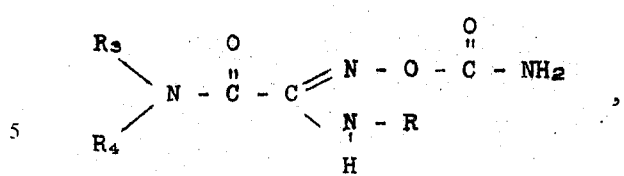

hereafter referred to as amino-oxime acetamide. The crude product, if solid, may be purified by recrystallization from suitable solvent, usually ethyl acetate or acetonitrile. When the product is an oil, it may be used for the next reaction without further purification.

One part of the above is reacted with one to one and one-half parts of the appropriate isocyanate R₁NCO in an inert solvent such as methylene chloride, tetrahydrofuran, chloroform, or ethyl acetate, and at a temperature of 20°C. to 40°C. The reaction is completed within one hour, but usually left stirring for two to three hours. The solvent is then removed by concentration under reduced pressure to give a solid product of 2-amino-2-N-alkylcarbamyloximido-N,N-dialkylacetamide.

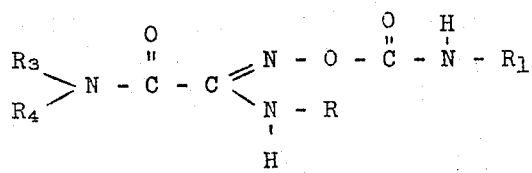

The product is purified by recrystallization from suitable solvents, usually ethyl acetate or an ethyl acetate-diethyl ether mixture.

Similarly, employing the same reaction conditions, one part of the amino-oxime acetamide is reacted with one to one and one-half parts of N,N-dialkylcarbamyl chloride

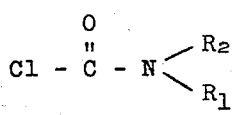

in the presence of one to one and one-half parts of triethylamine to give 2-amino-2-N,N-dialkylcarbamyloximido-N,N-dialkylacetamide

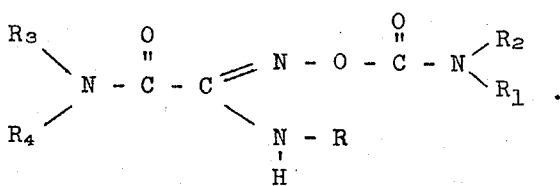

For the preparation of unsubstituted carbamyl derivatives, 1.2 parts (net weight) of dilute aqueous hydrochloric acid is added to a mixture of one part of amino-oxime acetamide and 1.23 parts of KOCN or NaOCN in a methylene chloride-water mixture at a temperature of 5°C. to 15°C. After 3–4 hours of stirring, the product, 2-amino-2-carbamyloximido-N,N-dialkylacetamide is isolated from the methylene chloride layer.

The preparation of the novel compounds of this invention is now illustrated by the following examples, wherein all parts, proportions, and percentages are by weight unless indicated otherwise.

EXAMPLE 1

2-(o-chlorobenzylamino)-2-oximido-N,N-dimethylacetamide

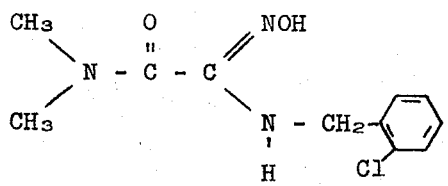

To a solution of 15 g. (0.01 mole) of 2-chloro-2-oximido-N,N-dimethylacetamide

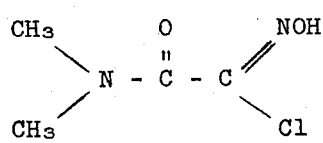

dissolved in 100 ml of tetrahydrofuran is added dropwise a mixture of 14.2 g (0.01 mole) of o-chlorobenzylamine and 10.1 g (0.01 mole) of triethylamine in 50 ml of tetrahydrofuran, keeping the temperature at 25°C. The mixture is stirred at room temperature (25°C.) for 15 hours and then filtered to remove triethylamine hydrochloride salt. The tetrahydrofuran filtrate is concentrated under reduced pressure, and the solid residue recrystallized from ethyl acetate to give pure 2-(o-chlorobenzylamino)-2-oximido-N,N-dimethylacetamide, m.p. 114°–116°C.

| | | | |
|---|---|---|---|
| Analysis Calculated for $C_{11}H_{14}ClN_3O_2$ (N.W. = 225.7): | | | |
| | C: 51.67; | H: 5.52; | N: 16.43 |
| Found | C: 51.77; | H: 5.45; | N: 16.99. |

EXAMPLES 2–34

The process of Example 1 is repeated substituting an equivalent amount of indicated amine for o-chlorobenzylamine of Example 1 to obtain the indicated product, as shown in Table I.

| Example | Amine | Product |
|---|---|---|
| 2 | benzylamine | 2-benzylamino-2-oximido-N,N-dimethylacetamide; m.p. 107°C. |

-Continued

| Example | Amine | Product |
|---|---|---|
| 3 | α-methylbenzylamine | α-(2-methylbenzylamino)-2-oximido-N,N-dimethylacetamide; oil |
| 4 | m-chlorobenzylamine | 2-(m-chlorobenzylamino)-2-oximido-N,N-dimethylacetamide; m.p. 123.5–125.5°C. |
| 4-A | p-chlorobenzylamine | 2-(p-chlorobenzylamino)-2-oximido-N,N-dimethylacetamide; m.p. 125–127°C. |
| 5 | o-fluorobenzylamine | 2-(o-fluorobenzylamino)-2-oximido-N,N-dimethylacetamide; m.p. 119–120.5°C. |
| 6 | p-fluorobenzylamine | 2-(p-fluorobenzylamino)-2-oximido-N,N-dimethylacetamide; m.p. 109–110.5°C. |
| 7 | p-fluoro-α-methylbenzylamine | 2-(p-fluoro-α-methylbenzylamino)-2-oximido-N,N-dimethylacetamide; m.p. 100–102°C. |
| 8 | o-bromobenzylamine | 2-(o-bromobenzylamino-2-oximido-N,N-dimethylacetamide; m.p. 128–130.5°C. |
| 9 | p-bromobenzylamine | 2-(p-bromobenzylamino)-2-oximido-N,N-dimethylacetamide; m.p. 135–137°C. |
| 10 | 2-phenylethylamine | 2-(2-phenylethylamino)-2-oximido-N,N-dimethylacetamide, HCl salt; m.p. 140–142°C. |
| 11 | 2-(-chlorophenyl)ethylamine | 2- 2-(p-chlorophenyl)ethylamino-2-oximido-N,N-dimethylacetamide; oil |
| 12 | o-trifluoromethylbenzylamine | 2-(o-trifluoromethylamino)-2-oximido-N,N-dimethylacetamide |
| 13 | o-chloro-α-methylbenzylamine | 2-(o-chloro-α-methylbenzylamino)-2-oximido-N,N-dimethylacetamide |
| 13A | p-chloro-α-methylbenzylamine | 2-(p-chloro-α-methylbenzylamino)-2-oximido-N,N-dimethylacetamide; m.p. 121–122°C. |
| 14 | o-chloro-α-n-propyl benzylamine | 2-(o-chloro-α-n-propylbenzylamino)-2-oximido-N,N-dimethylacetamide |
| 15 | o-fluoro-α-methylbenzylamine | 2-(o-fluoro-α-methylbenzylamino)-2-oximido-N,N-dimethylacetamide |
| 16 | aniline | 2-anilino-2-oximido-N,N-dimethylacetamide; m.p. 107°C. |
| 17 | p-chloroaniline | 2-(p-chloroanilino)-2-oximino-N,N-dimethylacetamide; m.p. 174–176°C. |
| 18 | m-chloroaniline | 2-(m-chloroanilino)-2-oximino-N,N-dimethylacetamide |
| 19 | o-chloroaniline | 2-(o-chloroanilino)-2-oximino-N,N-dimethylacetamide; m.p. 170°C. (dec.) |
| 20 | p-fluoroaniline | 2-(p-fluoroanilino)-2-oximino-N,N-dimethylacetamide; |
| 21 | m-fluoroaniline | 2-(m-fluoroanilino)-2-oximino-N,N-dimethylacetamide; 155°C. (dec.) |
| 22 | o-fluoroaniline | 2-(o-fluoroanilino)-2-oximino-N,N-dimethylacetamide; m.p. 132.5–134°C. |
| 23 | o-bromoaniline | 2-(o-bromoanilino)-2-oximido-N,N-dimethylacetamide; m.p. 165°C. (dec.) |
| 24 | p-bromoaniline | 2-(p-bromoanilino)-2-oximido-N,N-dimethylacetamide; m.p. 170°C. (dec.) |
| 25 | p-trifluoromethylaniline | 2-(p-trifluoromethylanilino-2-oximido-N,N-dimethylacetamide; m.p. 183–185°C. (dec.) |
| 26 | m-trifluoromethylaniline | 2-(m-trifluoromethylanilino)-2-oximido-N,N-dimethylacetamide; m.p. 140–142°C. |
| 27 | ammonia | 2-amino-2-oximido-N,N-dimethylacetamide |
| 28 | methylamine | 2-methylamino-2-oximido-N,N-dimethylacetamide; oil |
| 29 | iso-propylamine | 2-iso-propylamino-2-oximido-N,N-dimethylacetamide; m.p. 92–94.5°C. |
| 30 | n-propylamine | 2-n-propylamino-2-oximido-N,N-dimethylacetamide |
| 31 | allylamine | 2-allylamino-2-oximido-N,N-dimethylacetamide; m.p. 122–124°C. |

-Continued

| Example | Amine | Product |
|---|---|---|
| 32 | cyclohexylamine | 2-cyclohexylamino-2-oximido-N,N-dimethylacetamide; m.p. 129–131.5°C. |
| 33 | cyclopentylamine | 2-cyclopentylamino-2-oximido-N,N-dimethylacetamide; m.p. 139–141°C. |
| 34 | cycloheptylamine | 2-cycloheptylamino-2-oximido-N,N-dimethylacetamide; m.p. 101–103°C. |

EXAMPLE 35

The process of Example 1 is repeated substituting an equivalent amount of 2-chloro-2-oximido-N,N-di-n-propylacetamide for 2-chloro-2-oximido-N,N-dimethylacetamide of Example 1 to give 2-(o-chlorobenzylamino)-2-oximido-N,N-di-n-propylacetamide.

EXAMPLES 36–45

The process of Example 1 is repeated substituting an equivalent amount of 2-chloro-2-oximido-N,N-di-n-propylacetamide for 2-chloro-2-oximido-N,N-dimethylacetamide of Example 1, and an equivalent amount of indicated amine for o-chlorobenzylamine of Example 1 to obtain the indicated products, as shown in Table II.

Table II

| Example | Amine | Product |
|---|---|---|
| 36 | o-fluorobenzylamine | 2-(o-fluorobenzylamino)-2-oximido-N,N-di-n-propylacetamide |
| 37 | p-fluorobenzylamine | 2-(p-fluorobenzylamino)-2-oximido-N,N-di-n-propylacetamide |
| 38 | p-fluoroaniline | 2-(p-fluoroanilino)-2-oximido-N,N-di-n-propylacetamide |
| 39 | o-fluoroaniline | 2-(o-fluoroanilino)-2-oximido-N,N-di-n-propylacetamide |
| 40 | o-chloroaniline | 2-(o-chloroanilino)-2-oximido-N,N-di-n-propylacetamide |
| 41 | ammonia | 2-amino-2-oximido-N,N-di-n-propylacetamide |
| 42 | o-chloro-α-methylbenzylamine | 2-(o-chloro-α-methylbenzylamino)-2-oximido-N,N-di-n-propylacetamide |
| 43 | o-fluoro-α-n-propylbenzylamine | 2-(o-fluoro-α-n-propylbenzylamino)-2-oximido-N,N-di-n-propylacetamide |
| 44 | allylamine | 2-allylamino-2-oximido-N,N-di-n-propylacetamide |
| 45 | cyclohexylamine | 2-cyclohexylamino-2-oximido-N,N-di-n-propyl-acetamide |

EXAMPLE 46

2-(o-chlorobenzylamino)-2-N-methylcarbamyloximido-N,N-dimethylacetamide

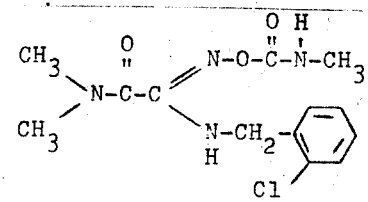

To a solution of 2.6 g (0.01 mole) of 2-(o-chlorobenzylamino)-2-oximido-N,N-dimethylacetamide (Example 1) dissolved in 10 ml of methylene chloride, is added 0.63 g (0.011 mole) of methyl isocyanate dissolved in 5 ml of methylene chloride, maintaining the temperature at 25°C. After 3 hours of stirring at 25°C., the solvent is removed by concentration under reduced pressure. The solid residue is recrystallized from an ethyl acetate-diethyl ether mixture to give pure 2-(o-chlorobenzylamino)-2-N-methylcarbamyloximido-N,N-dimethylacetamide; m.p. 114.5°–117°C.

|  | Analysis Calculated for $C_{13}H_{17}N_4O_3$: | | |
|---|---|---|---|
|  | C: 49.92; | H: 5.48; | N: 17.91 |
| Found | C: 49.97; | H: 5.40; | N: 17.95 |

EXAMPLES 47–90

The process of Example 46 is repeated substituting an equivalent amount of indicated amino-oxime acetamide obtained from Examples 2–45 for 2-(o-chlorobenzylamino)-2-oximido-N,N-dimethylacetamide of Example 46 to give the indicated product as shown in Table III.

Table III

| Example | Amino-oxime acetamide | Product |
|---|---|---|
| 47 | Example 2 | 2-benzylamino-2-N-methylcarbamyloximido-N,N-dimethylacetamide; m.p. 114–116°C |
| 48 | Example 3 | 2-(α-methylbenzylamino)-2-N-methylcarbamyloximido-N,N-dimethylacetamide; m.p. 125–127°C |
| 49 | Example 4 | 2-(m-chlorobenzylamino)-2-N-methylcarbamyloximido-N,N-dimethylacetamide; m.p. 127–129°C |
| 49A | Example 4A | 2-(p-chlorobenzylamino)-2-N-methylcarbamyloximide-N,N-dimethylacetamide; m.p. 105–107°C |
| 50 | Example 5 | 2-(o-fluorobenzylamino)-2-N-methylcarbamyloximido-N,N-dimethylacetamide; m.p. 119.5–121°C |
| 51 | Example 6 | 2-(p-fluorobenzylamino)-2-N-methylcarbamyloximido-n,N-dimethylacetamide; m.p. 121–122.5°C |
| 52 | Example 7 | 2-(p-fluoro-α-methylbenzylamino)-2-N-methylcarbamyloximido-n,N-dimethylacetamide; m.p. 115–117°C |
| 53 | Example 8 | 2-(o-bromobenzylamino)-2-N-methylcarbamyloximido-N,N-dimethylacetamide; m.p. 120–124°C |
| 54 | Example 9 | 2-(p-bromobenzylamino)-2-N-methylcarbamyloximido-N,N-dimethylacetamide; m.p. 93–96°C |
| 55 | Example 10 | 2-(2-phenylethylamino)-2-N-methylcarbamyloximido-N,N-dimethylacetamide; m.p. 103–106°C |
| 56 | Example 11 | 2-[2-(p-chlorophenyl)-ethylamino]-2-N-methylcarbamyloximido-N,N-dimethylacetamide; m.p. 108–110°C |
| 57 | Example 12 | 2-(o-trifluoromethylbenzylamino-)-2-N-methylcarbamyloximido-N,N-dimethylacetamide |

Table III-Continued

| Example | Amino-oxime acetamide | Product |
|---|---|---|
| 58 | Example 13 | 2-(o-chloro-α-methylbenzylamino)-2-N-methylcarbamyloximido-N,N-dimethylacetamide |
| 58A | Example 13A | 2-(p-chloro-α-methylbenzylamino)-2-N-methylcarbamyloximido-N,N-dimethylacetamide; 130°C. (dec.) |
| 59 | Example 14 | 2-(o-chloro-α-N-propylbenzylamino)-2-N-methylcarbamyloximido-N,N-dimethylacetamide |
| 60 | Example 15 | 2-(o-fluoro-α-methylbenzylamino)-2-N-methylcarbamyloximido-N,N-dimethylacetamide |
| 61 | Example 16 | 2-anilino-2-N-methylcarbamyloximido-N,N-dimethylacetamide; m.p. 146–148°C |
| 62 | Example 17 | 2-(p-chloroanilino)-2-N-methylcarbamyloximido-N,N-dimethylacetamide; m.p. 156–158°C |
| 63 | Example 18 | 2-(m-chloroanilino)-2-N-methylcarbamyloximido-N,N-dimethylacetamide; m.p. 144–146°C |
| 64 | Example 19 | 2-(o-chloroanilino)-2-N-methylcarbamyloximido-N,N-dimethylacetamide; m.p. 184.5–186°C |
| 65 | Example 20 | 2-(p-fluoroanilino)-2-N-methylcarbamyloximido-N,N-dimethylacetamide; m.p. 160–162°C |
| 66 | Example 21 | 2-(m-fluoroanilino)-2-N-methylcarbamyloximido-N,N-dimethylacetamide; m.p. 152°C (dec.) |
| 67 | Example 22 | 2-(o-fluoroanilino)-2-N-methylcarbamyloximido-N,N-dimethylacetamide; m.p. 132–134°C |
| 68 | Example 23 | 2-(o-bromoanilino)-2-N-methylcarbamyloximido-N,N-dimethylacetamide; m.p. 175°C (dec.) |
| 69 | Example 24 | 2-(p-bromoanilino)-2-N-methylcarbamyloximido-N,N-dimethylacetamide; m.p. 144–146°C |
| 70 | Example 25 | 2-(p-trifluoromethylanilino-2-N-methylcarbamyloximido-N,N-dimethylacetamide; m.p. 173°C (dec.) |
| 71 | Example 26 | 2-(m-trifluoromethylanilino)-2-N-methylcarbamyloximido-N,N-dimethylacetamide; m.p. 171°C (dec.) |
| 72 | Example 27 | 2-amino-2-N-methylcarbamyloximido-N,N-dimethylacetamide; m.p. 148–149°C |
| 73 | Example 28 | 2-methylamino-2-N-methylcarbamyloximido-N,N-dimethylacetamide; m.p. 119–121.5°C |
| 74 | Example 29 | 2-iso-propylamino-2-N-methylcarbamyloximido-N,N-dimethylacetamide; m.p. 144.5–147°C |
| 75 | Example 30 | 2-n-propylamino-2-N-methylcarbamyloximido-N,N-dimethylacetamide |
| 76 | Example 31 | 2-allylamino-2-N-methylcarbamyloximido-N,N-dimethylacetamide; m.p. 107–108.5°C |
| 77 | Example 32 | 2-cyclohexylamino-2-N-methylcarbamyloximido-N,N-dimethylacetamide; m.p. 180°C (dec.) |
| 78 | Example 33 | 2-cyclopentylamino-2-N-methylcarbamyloximido-N,N-dimethylacetamide; m.p. 160°C (dec.) |

Table III-Continued

| Example | Amino-oxime acetamide | Product |
|---|---|---|
| 79 | Example 34 | 2-cycloheptylamino-2-N-methylcarbamyloximido-N,N-dimethylacetamide; m.p. 142–145°C |
| 80 | Example 35 | 2-(o-chlorobenzylamino)-2-N-methylcarbamyloximido-N,N-di-n-propylacetamide |
| 81 | Example 36 | 2-(o-fluorobenzylamino)-2-N-methylcarbamyloximido-N,N-di-n-propylacetamide |
| 82 | Example 37 | 2-(p-fluorobenzylamino)-2-N-methylcarbamyloximido-N,N-di-n-propylacetamide |
| 83 | Example 38 | 2-(p-fluoroanilino)-2-N-methylcarbamyloximido-N,N-di-n-propylacetamide |
| 84 | Example 39 | 2-(o-fluoroanilino)-2-N-methylcarbamyloximido-N,N-di-n-propylacetamide |
| 85 | Example 40 | 2-(o-chloroanilino)-2-N-methylcarbamyloximido-N,N-di-n-propylacetamide |
| 86 | Example 41 | 2-amino-2-N-methylcarbamyloximido-N,N-di-n-propylacetamide |
| 87 | Example 42 | 2-(o-chloro-α-methylbenzylamino)-2-N-methylcarbamyloximido-N,N-di-n-propylacetamide |
| 88 | Example 43 | 2-(o-fluoro-α-n-propylbenzylamino)-2-N-methylcarbamyloximido-N,N-di-n-propylacetamide |
| 89 | Example 44 | 2-allylamino-2-N-methylcarbamyloximido-N,N-di-n-propyl acetamide |
| 90 | Example 45 | 2-cyclohexylamino-2-N-methylcarbamyloximido-N,N-di-n-propylacetamide |

EXAMPLE 91

To a solution of 2.6 g (0.01 mole) of 2-(o-chlorobenzylamino)-2-oximido-N,N-dimethylacetamide (Example 1) in 10 ml of methylene chloride is added 0.94 g (0.011 mole) of n-propyl isocyanate. By following a procedure identical to that of Example 46, 2-(o-chlorobenzylamino)-2-N-n-propylcarbamyloximido-N,N-dimethylacetamide is produced.

EXAMPLES 92–112

The process of Example 91 was repeated, substituting an equivalent amount of indicated amino-oxime acetamide obtained from Examples 2–45 in place of 2-(o-chlorobenzylamino)-2-oximido-N,N-dimethylacetamide (Example 91) to yield the indicated products shown in Table IV.

Table IV

| Example | Amino-oxime acetamide | Product |
|---|---|---|
| 92 | Example 2 | 2-benzylamino-2-N-n-propylcarbamyloximido-N,N-dimethylacetamide |
| 93 | Example 3 | 2-(α-methylbenzylamino)-2-N-n-propylcarbamyloximido-N,N-dimethylacetamide |
| 94 | Example 5 | 2-(o-fluorobenzylamino)-2-N-n-propylcarbamyloximido-N,N-dimethylacetamide |
| 95 | Example 7 | 2-(p-fluoro-α-methylbenzylamino)-2-N-n-Propylcarbamyloximido-N,N-dimethylacetamide |
| 96 | Example 11 | 2-[2-(p-chlorophenyl)ethylamino]-2-N-n-propylcarbamyloximido-N,N-dimethylacetamide |
| 97 | Example 16 | 2-anilino-2-N-n-propylcarbamyloximido-N,N-dimethylacetamide |
| 98 | Example 19 | 2-(o-chloroanilino)-2-N-n-propylcarbamyloximido-N,N-dimethylacetamide |
| 99 | Example 22 | 2-(o-fluoroanilino)-2-N-n-propylcarbamyloximido-N,N-dimethylacetamide |
| 100 | Example 27 | 2-amino-2-N-n-propylcarbamyloximido-N,N-dimethylacetamide |
| 101 | Example 29 | 2-iso-propylamino-2-N-n-propylcarbamyloximido-N,N-dimethylacetamide |
| 102 | Example 31 | 2-allylamino-2-N-n-propylcarbamyloximido-N,N-dimethylacetamide |
| 103 | Example 32 | 2-cyclohexylamino-2-N-n-propylcarbamyloximido-N,N-dimethylacetamide |
| 104 | Example 35 | 2-(o-chlorobenzylamino)-2-N-n-propylcarbamyloximido-N,N-di-n-propylacetamide |
| 105 | Example 36 | 2-(o-fluorobenzylamino)-2-N-n-propylcarbamyloximido-N,N-di-n-propylacetamide |
| 106 | Example 39 | 2-(o-fluoroanilino)-2-N-n-propylcarbamyloximido-N,N-di-n-propylacetamide |
| 107 | Example 40 | 2-(o-chloroanilino)-2-N-n-propylcarbamyloximido-N,N-di-n-propylacetamide |
| 108 | Example 41 | 2-amino-2-N-n-propylcarbamyloximido-N,N-di-n-propylacetamide |
| 109 | Example 42 | 2-(o-chloro-α-methylbenzylamino)-2-N-n-propylcarbamyloximido-N,N-di-n-propylacetamide |
| 110 | Example 43 | 2-(o-fluoro-α-n-propylbenzylamino)-2-N-n-propylcarbamyloximido-N,N-di-n-propylacetamide |
| 111 | Example 44 | 2-allylamino-2-N-n-propylcarbamyloximido-N,N-di-n-propylacetamide |
| 112 | Example 45 | 2-cyclohexylamino-2-N-n-propylcarbamyloximido-N,N-di-n-propylacetamide |

EXAMPLE 113

2-(o-chlorobenzylamino)-2-N,N-dimethylcarbamyloximide-N,N-dimethylacetamide

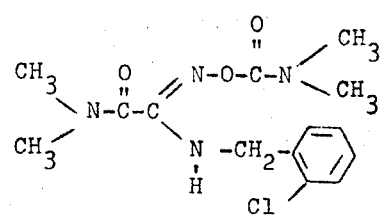

To a mixture of 2.6 g (0.01 mole) of 2-(o-chlorobenzylamino)-2-oximido-N,N-dimethylacetamide (Example 1) and 1.1 g (0.011 mole) of triethylamine in 15 ml of tetrahydrofuran is added a solution of 1.2 g (0.011 mole) of N,N-dimethylcarbamyl chloride dissolved in 5 ml of tetrahydrofuran, keeping the temperature at 20°C. After 3 hours of stirring at 25°C, the triethylamine hydrochloride salt is removed by filtration and the filtrate concentrated to give 2-(o-chlorobenzylamino)-2-N,N-dimethylcarbamyloximido-N,N-dimethylacetamide.

EXAMPLES 114–125

The process of Example 113 was repeated, substituting an equivalent amount of indicated amino-oxime acetamide obtained from Examples 2–45 in place of 2-(o-chlorobenzylamino)-2-oximido-N,N-dimethylacetamide (Example 113) to yield the indicated products shown in Table V.

Table V

| Example | Amino-oxime acetamide | Product |
| --- | --- | --- |
| 114 | Example 2 | 2-benzylamino-2-N,N-dimethylcarbamyloximido-N,N-dimethylacetamide |
| 115 | Example 5 | 2-(o-fluorobenzylamino)-2-N,N-dimethylcarbamyloximido-N,N-dimethylacetamide |
| 116 | Example 11 | 2-[2-(p-chlorophenyl)ethylamino]-2-N,N-dimethylcarbamyloximido-N,N-dimethylacetamide |
| 117 | Example 19 | 2-(o-chloroanilino)-2-N,N-dimethylcarbamyloximido-N,N-dimethylacetamide |
| 118 | Example 22 | 2-(o-fluoroanilino)-2-N,N-dimethylcarbamyloximido-N,N-dimethylacetamide |
| 119 | Example 27 | 2-amino-2-N,N-dimethylcarbamyloximido-N,N-dimethylacetamide |
| 120 | Example 31 | 2-allylamino-2-N,N-dimethylcarbamyloximido-N,N-dimethylacetamide |
| 121 | Example 32 | 2-cyclohexyl-2-N,N-dimethylcarbamyloximido-N,N-dimethylacetamide |
| 122 | Example 35 | 2-(o-chlorobenzylamino)-2-N,N-dimethylcarbamyloximido-N,N-di-n-propylacetamide |
| 123 | Example 40 | 2-(o-chloroanilino)-2-N,N-dimethylcarbamyloximido-N,N-di-n-propylacetamide |
| 124 | Example 43 | 2-(o-fluoro-α-n-propylbenzylamino)-2-N,N-dimethylcarbamyloximido-N,N-dimethylacetamide |
| 125 | Example 44 | 2-allylamino-2-N,N-dimethylcarbamyloximido-N,N-dimethylacetamide |

EXAMPLE 126

2-(o-chlorobenzylamino)-2-N,N-diethylcarbamyloximido-N,N-dimethylacetamide

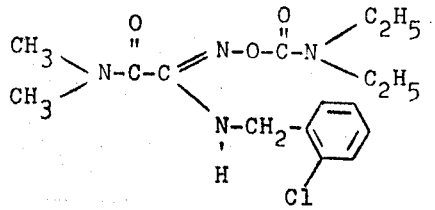

The process of Example 113 is repeated, substituting an equivalent amount of N,N-diethylcarbamylchloride in place of N,N-dimethylcarbamyl chloride (Example 113) to yield 2-(o-chlorobenzylamino)-2-N,N-diethylcarbamyloximido-N,N-dimethylacetamide.

EXAMPLE 127

2-(o-chlorobenzylamino)-2-carbamyloximido-N,N-dimethylacetamide

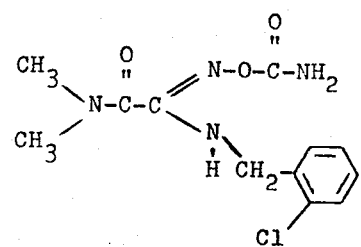

To a mixture of 2.6 g (0.01 mole) of 2-(o-chlorobenzylamino)-2-oximido-N,N-dimethylacetamide (Example 1) and 0.8 g (0.0123 mole) of NaOCN in 10 ml. of methylene chloride and 10 ml of water is added at 5°C, with good stirring, 12 ml of 1 N. hydrochloric acid. After 3 hours of stirring at 5°C, the methylene chloride layer is separated, dried over anhydrous MgSO$_4$, and concentrated to give 2-(o-chlorobenzylamino)-2-carbamyloximido-N,N-dimethylacetamide.

EXAMPLES 128–139

The process of Example 127 is repeated, substituting an equivalent amount of indicated amino-oxime acetamide obtained from Examples 1–45 in place of 2-(o-chlorobenzylamino)-2-carbamyloximido-N,N-dimethylacetamide (Example 127) to yield the indicated products shown in Table VI.

Table VI

| Example | Amino-oxime acetamide | Product |
| --- | --- | --- |
| 129 | Example 5 | 2-(o-fluorobenzylamino)-2-carbamyloximido-N,N-dimethylacetamide |
| 130 | Example 11 | 2-[2-(p-chlorophenyl)ethylamino]-2-carbamyloximido-N,N-dimethylacetamide |
| 131 | Example 19 | 2-(o-chloroanilino)-2-carbamyloximido-N,N-dimethylacetamide |
| 132 | Example 22 | 2-(o-fluoroanilino)-2-carbamyloximido-N,N-dimethylacetamide |
| 133 | Example 27 | 2-amino-2-carbamyloximido-N,N-dimethylacetamide |
| 134 | Example 31 | 2-allylamino-2-carbamyloximido-N,N-dimethylacetamide |
| 135 | Example 32 | 2-cyclohexylamino-2-carbamyloximido-N,N-dimethylacetamide |

Table VI-Continued

| Example | Amino-oxime acetamide | Product |
|---------|----------------------|---------|
| 136 | Example 35 | 2-(o-chlorobenzyl-amino)-2-carbamyl-oximido-N,N-di-n-propylacetamide |
| 137 | Example 40 | 2-(o-chloroanilino)-2-carbamyloximido-N,N-di-n-propyl-acetamide |
| 138 | Example 43 | 2-(o-fluoro-α-n-propyl-benzylamino)-2-carbamyl-oximido-N,N-di-n-propyl-acetamide |
| 139 | Example 44 | 2-allylamino-2-carbamyl-oximido-N,N-di-n-propyl-acetamide |

The compounds of this invention can be administered in the treatment of hypertension by any means that effects contact of the active ingredient compound with the site of action in the body of a warm-blooded animal. For example, administration can be parenteral, i.e., subcutaneous, intravenous, intramuscular, or intraperitoneal. Alternatively or concurrently, administration can be by the oral route.

For the purpose of this disclosure, a warm-blooded animal is a member of the animal kingdom possessed of a homeostatic mechanism and includes mammals and birds.

The dosage administered will be dependent on the age, health and weight of the recipient, the extent of disease, kind of concurrent treatment, if any, frequency of treatment and the nature of the effect desired. Usually, a daily dosage of active ingredient compound will be from about 0.01 to 50 milligrams per kilogram of body weight. Ordinarily, from 0.05 to 40, and preferably 0.1 to 20, milligrams per kilogram per day in one or more applications per day is effective to obtain desired results.

The antihypertensive activity of the compounds of this invention is evidenced by tests conducted in hypertensive rats. In these tests rats are made hypertensive by repeated injections of desoxycorticosterone acetate (DOCA) according to the method described by Stanton and White [Arch. Intern. Pharmacodyn., 154, 351 (1965)]. Graded dose levels of each compound are administered orally to groups of 8 hypertensive rats. The compound is prepared in an aqueous polyvinyl alcohol/-acacia vehicle and administered at a volume to body weight ratio of 5.0 ml/kg. Sixteen hypertensive rats receiving the aqueous vehicle by the same route serve as controls for each test. At various intervals of time after treatment, usually 90 minutes, the systolic blood pressure of each rat is determined by a modification of the microphone-manometer technique [Friedman, M. and Freed, S.C. Proc. Soc. Exp. Biol. and Med., 70, 670 (1959)]. That dose expressed in milligrams (mg) per kilogram (kg) of compound which produces a 30 mm mercury (mm Hg) reduction in blood pressure when compared to the mean systolic blood pressure of the control animals is then determined and reported as the $ED_{30}$ (effective dose for 30 mm Hg reduction in blood pressure).

Table VII shows the $ED_{30}$ value of representative compounds of this invention.

Table VII

| Ex. | Compound | $ED_{30}$ (mg/kg) |
|-----|----------|-------------------|
| 46 | 2-(o-chlorobenzylamino)-2-N-methylcarbamyloximido-N,N-dimethylacetamide | 3.6 |
| 50 | 2-(o-fluorobenzylamino)-2-N-methylcarbamyloximido-N,N-dimethylacetamide | 4.6 |
| 52 | 2-(p-fluoro-α-methylbenzylamino)-2-N-methylcarbamyloximido-N,N-dimethylacetamide | 7.2 |
| 78 | 2-cyclopentylamino-2-N-methylcarbamyloximido-N,N-dimethylacetamide | 8.0 |
| 68 | 2-(o-bromoanilino)-2-N-methylcarbamyloximido-N,N-dimethylacetamide | 8.4 |
| 49 | 2-(m-chlorobenzylamino)-2-N-methylcarbamyloximido-N,N-dimethylacetamide | 8.4 |
| 64 | 2-(o-chloroanilino)-2-N-methylcarbamyloximido-N,N-dimethylacetamide | 8.6 |
| 72 | 2-amino-2-N-methylcarbamyloximido-N,N-dimethylacetamide | 9.5 |
| 47 | 2-benzylamino-2-N-methylcarbamyloximido-N,N-dimethylacetamide | 11 |
| 70 | 2-(p-trifluoromethylanilino)-2-N-methylcarbamyloximido-N,N-dimethylacetamide | 11 |
| 66 | 2-(m-fluoroanilino)-2-N-methylcarbamyloximido-N,N-dimethylacetamide | 11 |
| 77 | 2-cyclohexylamino-2-N-methylcarbamyloximido-N,N-dimethylacetamide | 12 |
| 76 | 2-allylamino-2-N-methylcarbamyloximido-N,N-dimethylacetamide | 12 |
| 62 | 2-(p-chloroanilino)-2-N-methylcarbamyloximido-N,N-dimethylacetamide | 14 |
| 61 | 2-anilino-2-N-methylcarbamyloximido-N,N-dimethylacetamide | 15 |
| 48 | 2-(α-methylbenzylamino)-2-N-methylcarbamyloximido-N,N-dimethylacetamide | 15 |
| 67 | 2-(o-fluoroanilino)-2-N-methylcarbamyloximido-N,N-dimethylacetamide | 17 |
| 55 | 2-(2-phenylethylamino)-2-N-methylcarbamyloximido-N,N-dimethylacetamide | 19 |
| 58A | 2-(p-chloro-α-methylbenzylamino)-2-N-methylcarbamyloximido-N,N-dimethylacetate | 19 |
| 73 | 2-methylamino-2-N-methylcarbamyloximido-N,N-dimethylacetamide | 25 |
| 74 | 2-iso-propylamino-2-N-methylcarbamyloximido-N,N-dimethylacetamide | 25–50 |
| 69 | 2-(p-bromoanilino)-2-N-methylcarbamyloximido-N,N-dimethylacetamide | 25–50 |
| 49A | 2-(p-chlorobenzylamino)-2-N-methylcarbamyloximido-N,N-dimethylacetamide | 27 |
| 54 | 2-(p-bromobenzylamino)-2-N-methylcarbamyloximido-N,N-dimethylacetamide | 28 |
| 51 | 2-(p-fluorobenzylamino)-2-N-methylcarbamyloximido-N,N-dimethylacetamide | 32 |

The compounds of this invention can be employed in useful pharmaceutical compositions according to the present invention in such formulations as injectables and oral dosage forms, such as tablets, hard gelatin capsules, soft gelatin capsules, oral suspensions, syrups and elixirs. In such compositions, the active ingredient is ordinarily present in an amount of at least 0.5% by weight based on the total weight of the composition and not more than 90% by weight.

Besides the active ingredient compound of this invention, the antihypertensive composition contains a solid or liquid nontoxic pharmaceutical carrier for the active ingredient, and can also contain other additives such as lubricants, binding agents, disintegrants, preservatives, colorants, and flavors, which are common to the art.

In one embodiment of the pharmaceutical composition of this invention, the dosage form is a capsule which can be of the ordinary gelatin type. In another embodiment, the active ingredient is tableted with a suitable diluent. These capsules and tablets generally constitute from about 1% to about 95% and preferably from 5% to 90% by weight of active ingredient.

The pharmaceutical carrier can, as previously indicated, be a sterile liquid such as water or an oil, including those of petroleum, animal, vegetable oils of synthetic origin, for example peanut oil, soybean oil, mineral oil, sesame oil, and the like. In general, water, saline, aqueous dextrose (glucose) and related sugar solutions and glycols such as propylene glycol or polyethylene glycols are preferred liquid carriers, particularly for injectable solutions. Sterile injectable solutions such as saline ordinarily contain from about 0.5% to 25% and preferably about 1 to 10% by weight of the active ingredient.

Liquid oral administration can be in a suitable suspension, syrup or elixir, in which the active ingredient ordinarily constitutes from about 0.5 to 10% and preferably about 1 to 5% by weight. The pharmaceutical carrier in such composition can be a watery vehicle such as a aromatic water, a syrup, a pharmaceutical mucilage, or a hydro-alcoholic elixir.

Suitable pharmaceutical carrier, diluents and additives are described in "Remington's Pharmaceutical Sciences" by E. W. Martin, a well-known reference text in this field.

The following examples will further illustrate the preparation of pharmaceutical compositions of the invention.

EXAMPLE A

A large number of unit capsules are prepared by filling standard two-piece gelatin capsules each with 50 milligrams of powdered 2-(o-chlorobenzylamino)-2-N-methylcarbamyloximido-N,N-dimethylacetamide, 300 milligrams of lactose, 32 milligrams of talc and 8 milligrams of magnesium stearate.

EXAMPLE B

A mixture of the active ingredient in soybean oil is prepared and injected by means of a positive displacement pump into gelatin to form soft gelatin capsules containing 35 milligrams of 2-(o-chlorobenzylamino)-2-N-methylcarbamyloximido-N,N-dimethylacetamide. The capsules are washed in petroleum ether and dried.

EXAMPLE C

A large number of tablets are prepared by convention procedures so that the dosage unit is 300 milligrams of 2-(o-chlorobenzylamino)-2-N-methylcarbamyloximido-N,N-dimethylacetamide, 7 milligrams of ethyl cellulose, 0.2 milligrams of colloidal silicon dioxide, 7 milligrams of magnesium stearate, 11 milligrams of microcrystalline cellulose, 11 milligrams of cornstarch, and 98.8 milligrams of lactose. Appropriate coatings may be applied to increase palatability or delay absorption.

EXAMPLE D

A parenteral composition suitable for administration by injection is prepared by stirring 1.5% by weight of 2-(o-chlorobenzylamino)-2-N-methylcarbamyloximido-N,N-dimethylacetamide in 10% by volume propylene glycol and water. The solution is sterilized by filtration.

EXAMPLE E

An aqueous suspension is prepared for oral administration so that each 5 milliliters contain 50 milligrams of finely divided 2-(o-chlorobenzylamino)-2-N-methylcarbamyloximido-N,N-dimethylacetamide, 500 milligrams of acacia, 50 milligrams of sodium benzoate, 1.0 grams of sorbitol solution, U.S.P., 5 milligrams of sodium saccharin and 0.025 milliliters of vanilla tincture.

A wide variety of compositions coming within this invention can be prepared by substituting other compounds of this invention, including specifically but not limited to those compounds named hereinbefore, for the compounds named in Examples A–E above, and substituting other suitable pharmaceutical carriers well known and described in the Martin text mentioned above.

I claim:

1. A compound of the formula

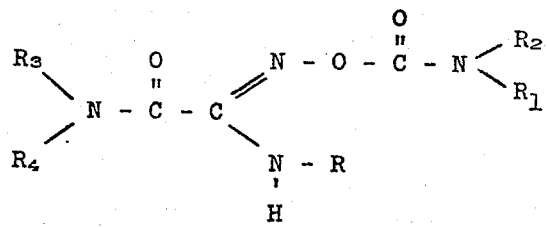

wherein
R is

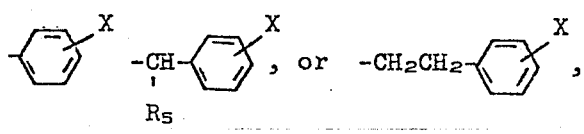

where
X is H, Br, Cl, F, or $CF_3$, and $R_5$ is H, $CH_3$, $C_2H_5$, n-$C_3H_7$, or iso-$C_3H_7$;
$R_1$ and $R_2$ are the same or different and are hydrogen, methyl, ethyl, normal propyl, isopropyl, cyclopropyl, or allyl, with the proviso that the sum of the carbon atoms in $R_1$ and $R_2$ does not exceed 4; and
$R_3$ and $R_4$ are the same or different and are $C_1$-$C_3$ alkyl.

2. A compound of claim 1 wherein $R_1$, $R_3$, and $R_4$ are methyl and $R_2$ is hydrogen.

3. 2-(o-Chlorobenzylamino)-2-N-methylcarbamyloximido-N,N-dimethylacetamide, a compound of claim 2 wherein R is

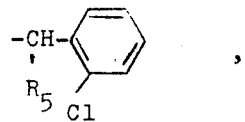

and $R_5$ is hydrogen.

4. 2-(m-Chlorobenzylamino)-2-N-methylcarbamyloximido-N,N-dimethylacetamide, a compound of claim 2 wherein R is

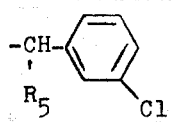

and R₅ is hydrogen.

5. 2-(o-Fluorobenzylamino)-2-N-methylcarbamyloximido-N,N-dimethylacetamide, a compound of claim 2 wherein R is

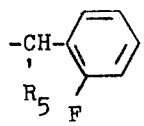

and R₅ is hydrogen.

6. 2-(p-Fluoro-α-methylbenzylamino)-2-N-methylcarbamyloximido-N,N-dimethylacetamide, a compound of claim 2 wherein R is

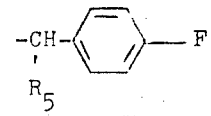

and R₅ is methyl.

* * * * *